United States Patent

[11] 3,610,548

| [72] | Inventor | Andre Quenot<br>Besancon, France |
|---|---|---|
| [21] | Appl. No. | 800,085 |
| [22] | Filed | Feb. 18, 1969 |
| [45] | Patented | Oct. 5, 1971 |
| [73] | Assignee | Quenot & Cie S.a.r.l.<br>Besancon, France |
| [32] | Priority | Oct. 10, 1968 |
| [33] | | France |
| [31] | | 169349 |

[54] BRAKING DEVICE FOR TAPE MEASURE AND THE LIKE
1 Claim, 1 Drawing Fig.

| [52] | U.S. Cl. | 242/107.3 |
| [51] | Int. Cl. | B65h 75/48 |
| [50] | Field of Search | 242/84.8, 107, 107.12, 107.2, 107.3, 107.4, 107.6; 33/138 |

[56] References Cited
UNITED STATES PATENTS

| 2,814,881 | 12/1957 | Ljungberg | 242/84.8 X |
| 2,934,283 | 4/1960 | Astore | 242/84.8 |
| 3,041,004 | 6/1962 | Busch | 242/107.3 |
| 3,164,907 | 1/1965 | Quenot | 242/84.8 X |
| 3,214,836 | 11/1965 | West | 242/107.3 X |
| 3,318,550 | 5/1967 | Quenot | 242/107.3 |

FOREIGN PATENTS

| 17,245 | 4/1905 | Great Britain | 33/138 |
| 1,305,855 | 8/1962 | France | 33/138 |

*Primary Examiner*—Stanley N. Gilreath
*Assistant Examiner*—Werner H. Schroeder
*Attorneys*—Robert E. Burns and Emmanuel J. Lobato

ABSTRACT: A device for controlling the unwinding of the tape of a linear measuring instrument having a tape wound in a casing is characterized by a lever forming the front side of the casing and mounted substantially perpendicular to the direction assumed by the tape at its outlet. The lever is pivoted in such a way that its extremity forming one of the walls of the outlet slot compresses under the urging of a spring the tape against the lower side of the slot along a tangential movement.

PATENTED OCT 5 1971
3,610,548
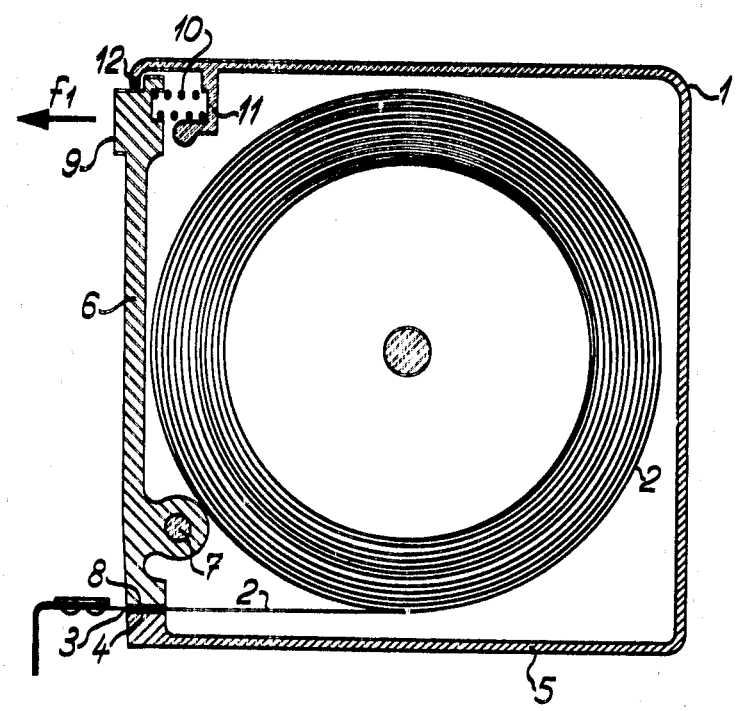

BRAKING DEVICE FOR TAPE MEASURE AND THE LIKE

There are already known a certain number of means for braking or wedging which allow the user to act on the winding or the rewinding of the tape of a linear measuring instrument. Some of these braking devices comprise a cam whose rotation compresses tangentially the tape owing to its eccentricity. When the tape is urged inside the casing for example under the urging of a spring it is possible by suitably selecting the rotational direction of the braking cam to accentuate the braking by utilizing the tendency of the tape to rewind itself. However such devices require placing into the casing of a relatively complicated and cumbersome mechanism.

Other braking devices wedge the tape by means of a finger whose movement is substantially perpendicular to the direction of the tape at the place where the latter is compressed. Such devices do not make it possible to accentuate the braking in the case of a tape which is urged to the inside of the casing.

Other devices use as braking means one of the sides of the casing which is mounted pivotally relative to the rest of the casing and which is provided with a tongue which under the urging of a spring compresses the tape measure. However it remains true that the breakage becomes inefficient when for some reason the spring no longer acts with a sufficient force on the thus-formed braking lever. Moreover since the braking tongue moves away in the direction perpendicular to the direction of the tape the latter is free as soon as the lever pivots and it is practically not possible to ensure the progressive braking thereof.

Consequently the invention proposes to provide a device for controlling the rewinding of the tape of a linear measuring instrument with a tape wound in a casing which will allow a progressive and foolproof braking of the tape with a minimum of cumbersomeness.

To this effect the invention is concerned with a device for controlling the rewinding of the tape of a linear measuring instrument with a tape wound in a casing characterized in that a lever whose direction is substantially perpendicular to the outlet of the tape is mounted pivotally around a pivot and urged by a spring in such a way that its extremity which can move practically tangentially to the tape may compress the said tape against a fixed element of the casing.

The invention will be better understood by referring to the following description made by way of nonlimiting example and to the accompanying drawing in which the single FIGURE shows a cross-sectional view of a measuring instrument provided with a device according to the invention.

The measuring instrument shown comprises a casing 1 inside which a tape 2 can be wound, for example round a drum or in any other manner. The tape 2 goes out of the casing through an outlet slot 3 one of whose lips 4 is stationary with respect to the casing. In the example shown tape 2 emerges into a direction parallel to that of the lower side 5 of casing 1.

The front side of the casing comprising slot 3 is constituted by lever 6 directed perpendicularly with respect to the outlet direction of tape 2 and movable around a pivot 7 carried by casing 1. The lower extremity 8 of said lever 6 forms a second lip of the outlet slot 3 and is conformed in such a way as to apply itself against tape 2 which is compressed against lip 4. The upper end of said lever 6 has a projection 9 having a pusher. The said extremity is urged in the direction of the arrow F1 by the action of a spring 10 which bears on a shoulder 11 of the casing. The upper side 12 of the said casing can advantageously terminate into a shoulder which can limit the course of lever 6 under the action of spring 10. It can be easily seen that the push due to spring 10 in the direction of arrow F1 urges lip 8 in the direction tending to wedge tape 2 against lip 4. On the contrary, a push on pusher 9 by cancelling the action of spring 10 makes it possible by pivoting lever 6 to move lip 8 away from tape 2 which is thus freed. The pressure exerted on the pusher 9 to compress spring 10 is translated by a circular movement of lip 8 which moves away in a direction almost tangential to said tape 2. It is thus possible to easily control the pressure of this lip 8 on the tape which can thus be braked in a progressive manner since a long movement of pusher 9 only causes a slight blocking of the tape owing to the ratio between the arms of the lever and of the almost tangential movement of lip 8 relative to the tape.

When tape 2 is urged by a return device (not shown), such as for example a spring, the said tape 2 tends to drive towards the inside of the casing lip 8. There results an accentuation of the working under the effect of the tension of the said return spring. Thus if for any reason the spring 10 no longer exerts sufficient action, the braking is nevertheless ensured owing to this self-tightening tendency. Additionally, when the user unwinds the tape without taking the trouble of unlocking the brake, the tape tends to automatically unblock the brake which eliminates a cause of wear of the tape by friction against the lips.

It goes without saying that the invention is amenable to various modifications. For example the positions of pivot 7 and of spring 10 which can be a blade or a spiral can vary. Lever 6 can form only a part of the front side of the casing or can be located inside the casing without constituting one of the walls thereof.

What is claimed is:

1. A tape measure device comprising a casing for receiving a coiled measuring tape therein, said casing having a tape receiving and dispensing opening disposed in the lower portion of the forward wall thereof and defined by a pair of opposed lips, and having a lever defining the major portion of said forward wall and being pivotally connected intermediate its ends to said casing to pivot about an axis within said casing; said lever having a pushbutton at one end of the outer face of said portion of said forward wall, and having one of said opposing lips at another end thereof and disposed normal to said forward wall, the other of said opposed lips being fixed to said casing and disposed parallel to said one lip; and a coil spring compressively mounted between said casing and said lever at said end thereof for urging said pushbutton outwardly of the casing to cause said one lip at said another end of the lever to wedge the tape against said fixed lip, said lever being pivotally movable against the force of said spring means to move said one end of said lever outwardly of said casing and tangentially away from the tape at said opening to allow said tape to be coiled within said casing.